United States Patent Office 2,995,691
Patented Aug. 8, 1961

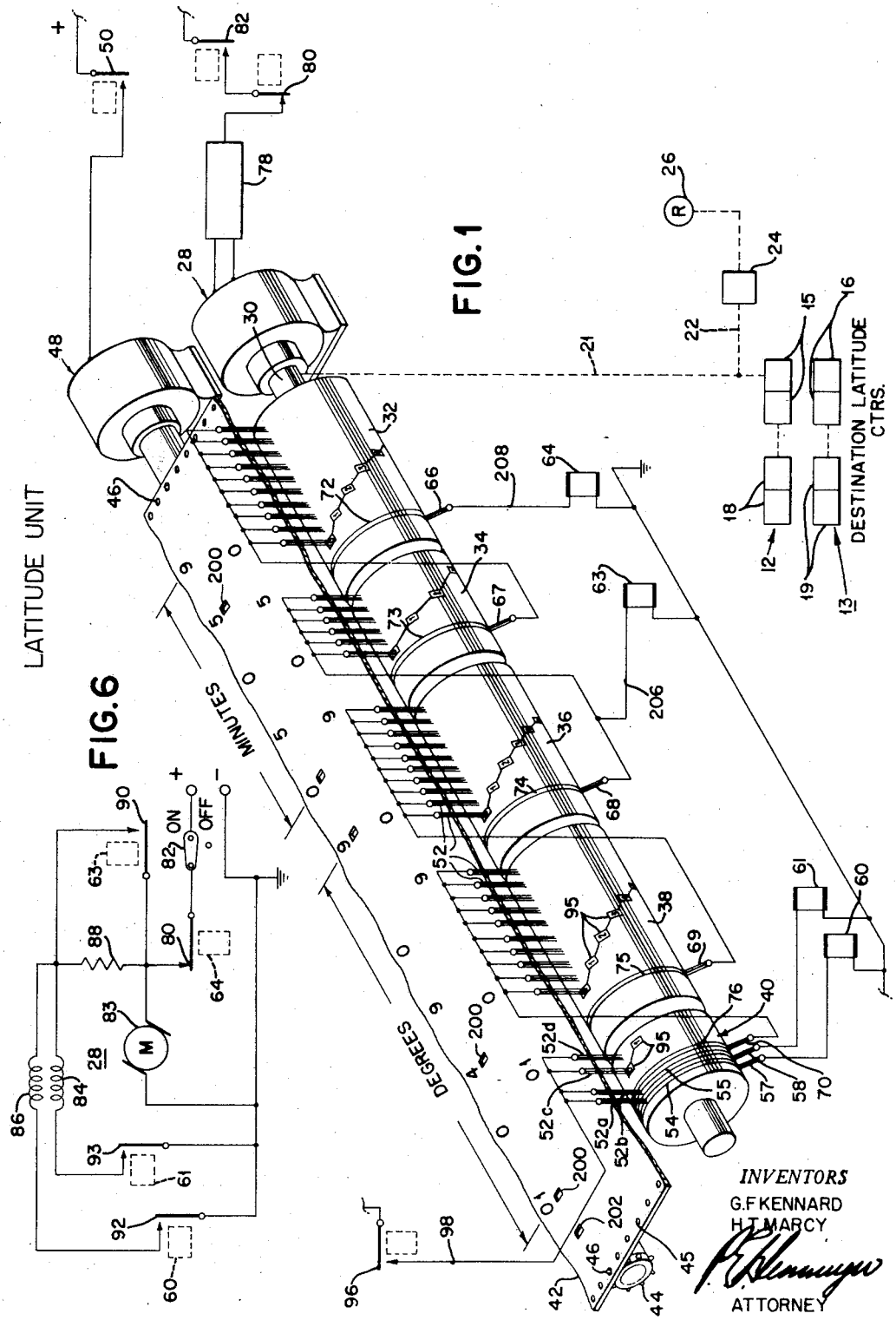

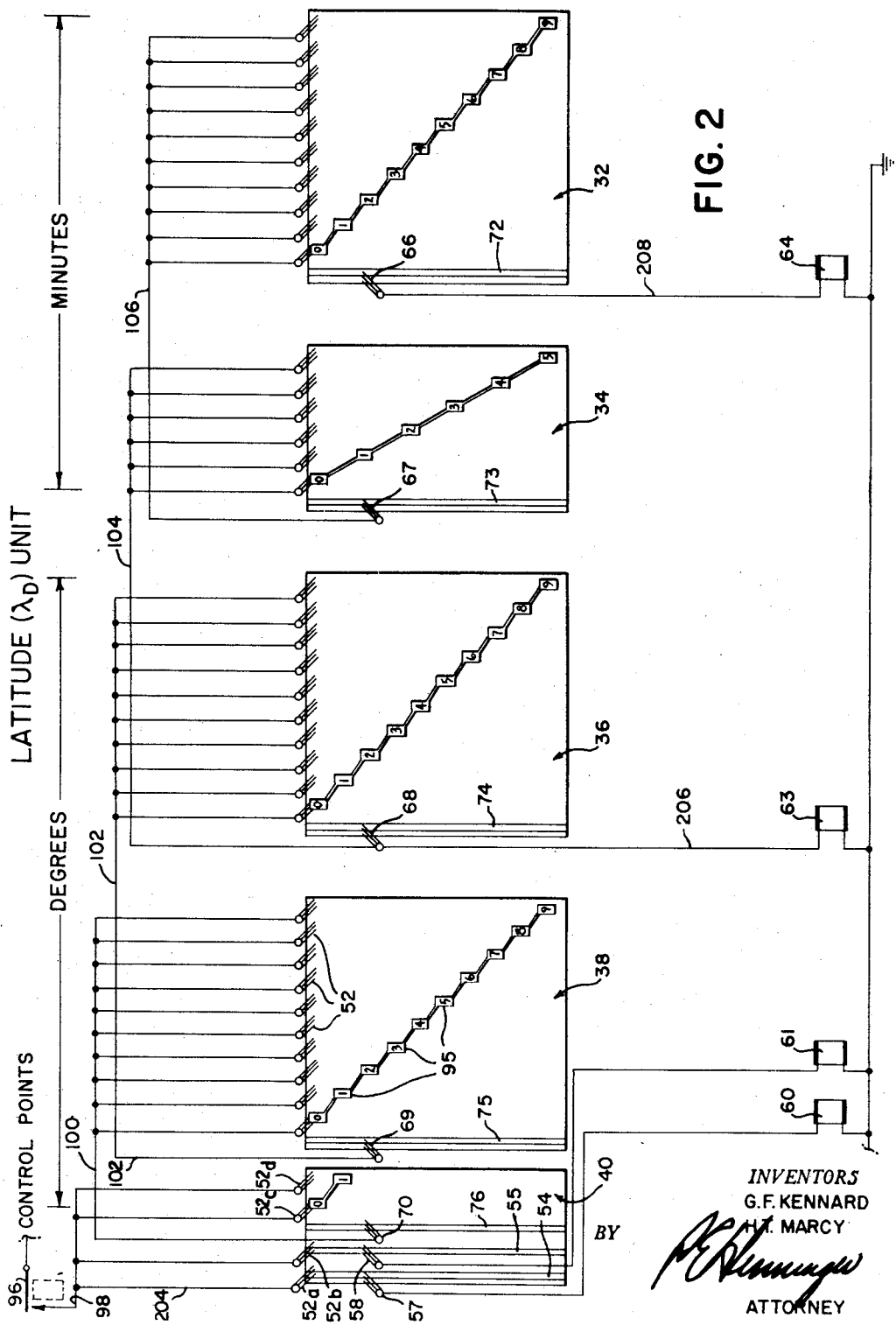

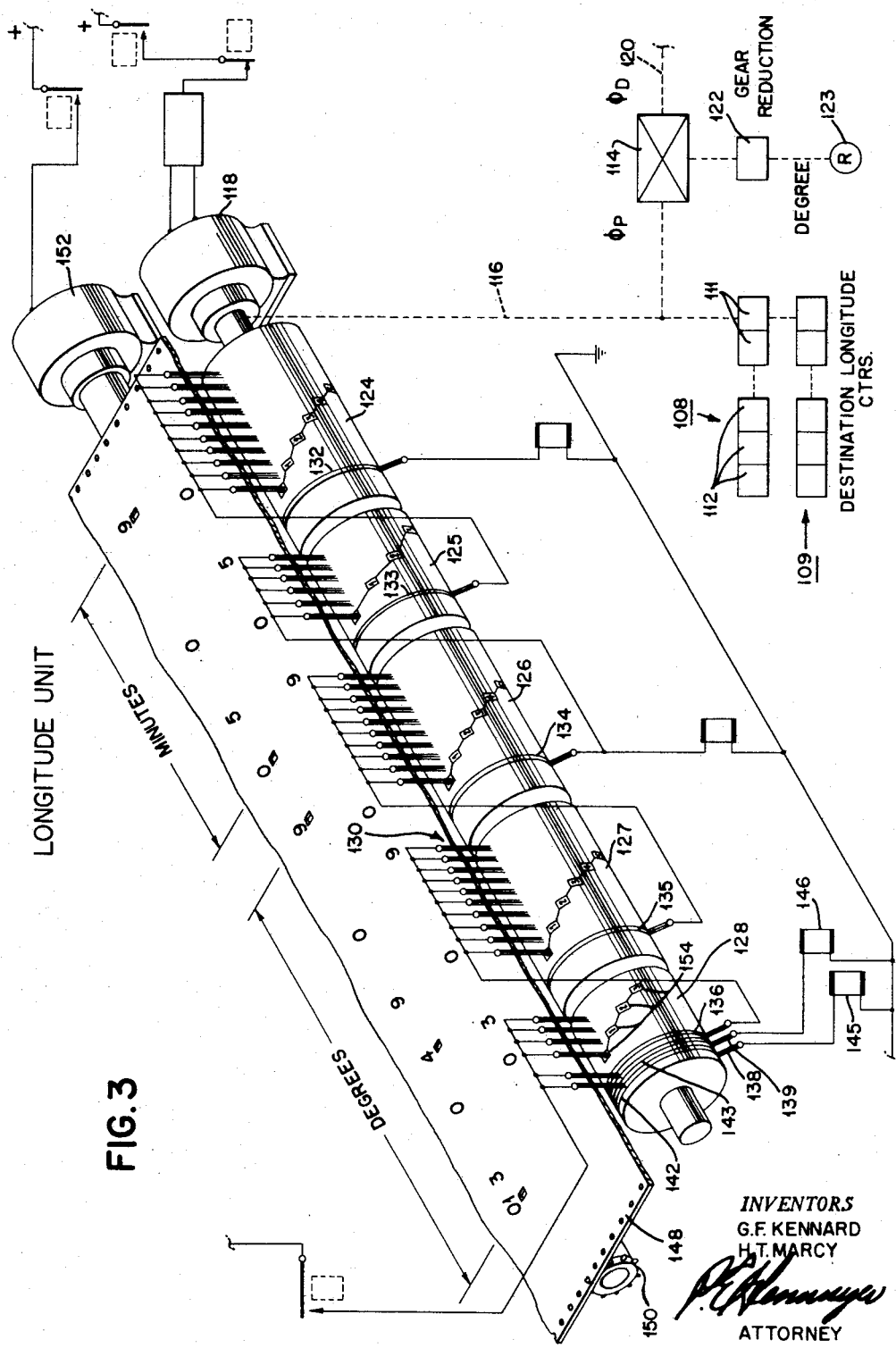

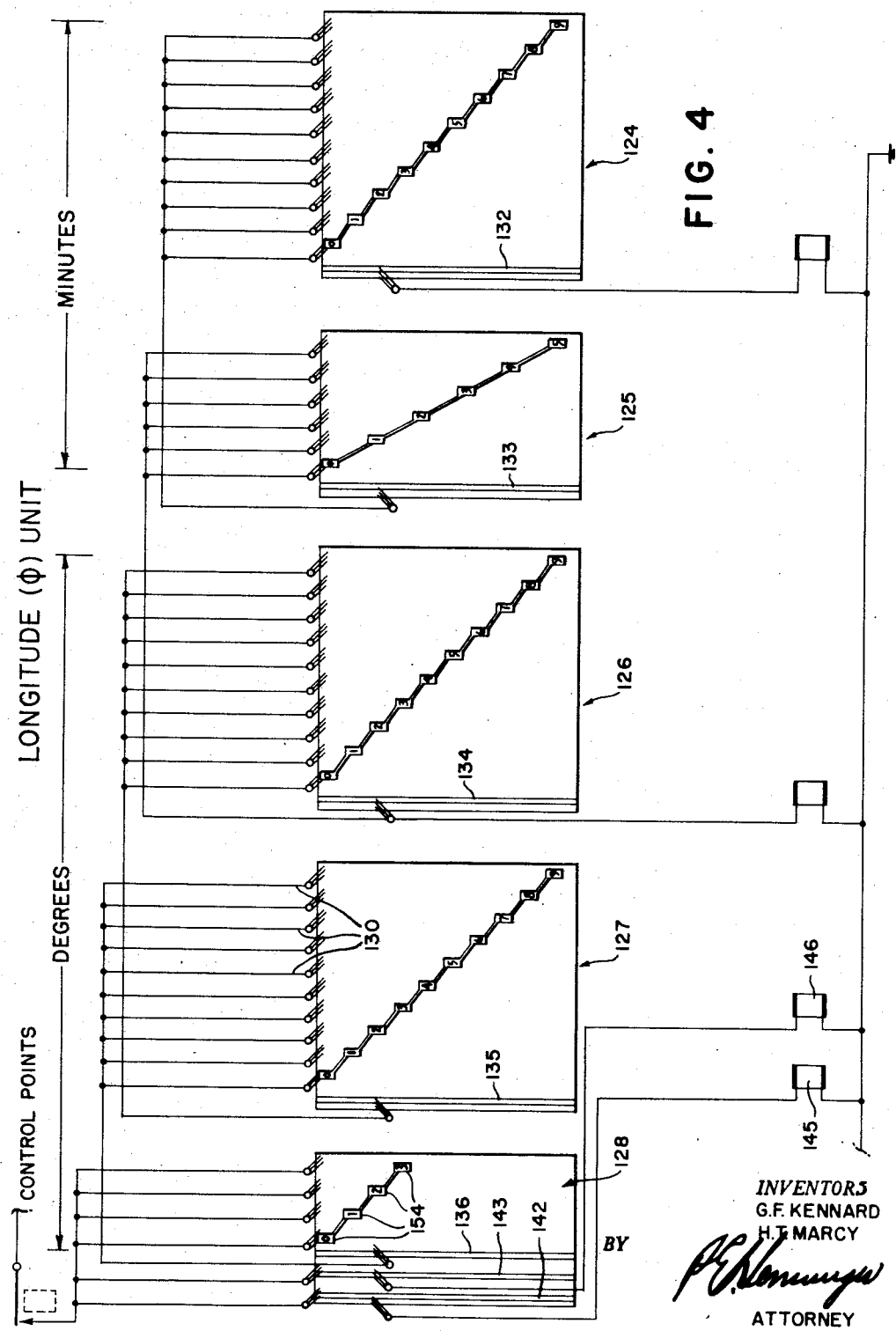

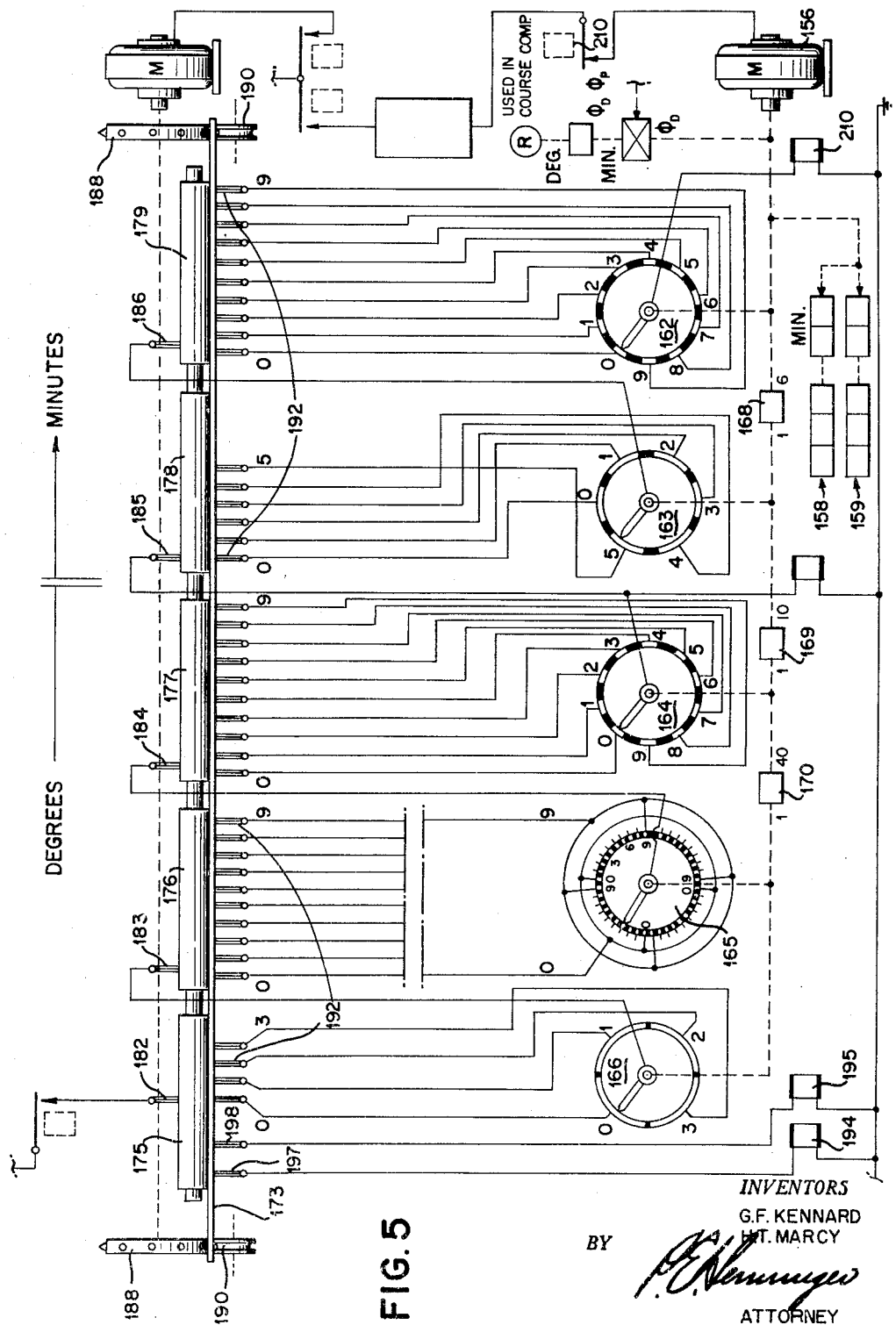

2,995,691
ELECTRIC MOTOR CONTROL SYSTEM FOR NAVIGATION PROGRAMMING

George F. Kennard, Endicott, and Henry Tyler Marcy, Vestal, N.Y., assignors to International Business Machines Corporation, New York, N.Y., a corporation of New York
Filed Dec. 28, 1954, Ser. No. 478,008
4 Claims. (Cl. 318—162)

This invention is concerned with an electric motor control system, and more specifically with a shaft positioning system whereby a series of interconnected shafts may be driven to a set of predetermined positions and stopped. The system involves circuit elements related to the series of interconnected shafts in such a way that the motor will run so as to drive from one end of the system and cause the shafts to run to a given position and stop when the predetermined position of each shaft is reached.

It is contemplated that a predetermined position for each of the interconnected shafts may be encoded on some record, e.g. on a tape as by punching holes therein, and then by using a circuit that involves the encoded position information, each shaft will be stopped at its predetermined position, one after the other until the last shaft (closest to the motor in the illustrated system) has reached its position whereupon the motor will stop and all the shafts will be in the predetermined positions.

With respect to another aspect, this invention is concerned with a programming device for use with a navigation system. In navigation, a predetermined destination may be set up in terms of its co-ordinates, i.e. the latitude and longitude of such position. By means of this invention a predetermined program of destinations may be set up on a record, e.g. by means of holes punched in a tape.

This invention provides an automatic control device which acts to set an indicator for each co-ordinate of a position, to the predetermined value of such co-ordinate, by positioning a record that contains the information for the co-ordinates of a series of predetermined positions. The indicator in such a system is a shaft driven visual device for displaying each co-ordinate for a position, while the shaft position in connection with such an indicator, at the same time, may be used in a navigation system as being representative of the values of such co-ordinates. In the system of this invention, each co-ordinate value is punched in a coded manner into a tape. The tape may then be set to a desired position, and the co-ordinate value which has been punched at this position will automatically be set up on the indicator and at the same time this co-ordinate value may be available for use in a navigation system. A navigation system with which this invention may be employed is disclosed in U.S. patent application Serial No. 396,838, filed December 8, 1953, for "Navigation System" by P. J. De George et al.

Consequently, it is an object of this invention to provide a device for use in connection with a navigation system which may provide automatic programming. By the term "automatic programming" it is intended to encompass a determination in advance, of various destinations which have their co-ordinate values set up on a recording means, so that each of the co-ordinates may be then translated into analogue representations for the values of latitude and longitude of each destination.

Another object of this invention is to provide an electric motor control wherein a predetermined position is encoded on a tape, and which includes means under control of the tape for operating the motor until the tape encoded position has been reached.

Another object of this invention is to provide an electric motor control system wherein a series of predetermined positional operations may be controlled by the setting of a record tape that has such positional operations encoded on the tape.

In the drawings:
FIG. 1 is a diagrammatic illustration of a latitude unit;
FIG. 2 is a schematic electric circuit diagram showing the surfaces of the latitude unit drums unrolled and illustrating the various control circuits for the relays that control the latitude motor of FIG. 1;
FIG. 3 is a diagrammatic illustration of a longitude unit similar to the latitude unit of FIG. 1;
FIG. 4 is a schematic electric circuit diagram showing the surfaces of the longitude unit drums unrolled and illustrating the various control circuits for the relays that control the motor driving the longitude indicator in FIG. 3;
FIG. 5 is a schematic illustration of another embodiment of the invention, illustrating only that part of the system for indicating longitude of a position; and
FIG. 6 is a circuit diagram showing the details of an energization and control circuit for any one of the indicator motors of FIGS. 1, 3 or 5.

In navigation, a position is located by means of co-ordinates of latitude and longitude. As is well known, latitude is measured in degrees and minutes north and south from the equator, so that the limits of latitude are 90 degrees north latitude, and 90 degrees south latitude. Similarly, longitude is measured in degrees and minutes east and west from a given meridian for 180 degrees so that maximum longitudes are 180 degrees east or 180 degrees west longitude. In any navigation system, in determining a course from one position to a different position, the co-ordinates of both positions must be determined. When a craft is travelling over the surface of the earth, in order to navigate to a predetermined destination, the difference between the craft's present position and the destination must be known. Such difference will be expressed in terms of the co-ordinates of the destination and the present position. By means of this invention, the co-ordinates of a predetermined destination may be set up on a tape in code, and in this way the tape merely need be set to the desired destination, and the co-ordinate values of such destination will automatically set themselves in terms of a shaft position and also in terms of a digital indicator in connection with such shaft position. In other words, the tape will be set to the desired destination and then a motor will be energized that will drive the destination indicators to the proper co-ordinate values of that destination, and stop.

It will be clear to one skilled in the art that, as indicated above, this invention may be applied to any use where it is desired to have a plurality of shafts driven to a predetermined position by an electric motor. Many such uses will suggest themselves as the description proceeds. However, the detailed description herein will be limited to the use in a navigation system, in order to avoid an overburdening of this disclosure with unnecessary details.

Referring to FIG. 1, it will be observed that a latitude unit is illustrated therein. There are a pair of latitude indicators 12 and 13 that provide a visual indication of the destination latitude in degrees and minutes. These indicators may be of any suitable type such as ordinary revolution counters illustrated schematically at 15, 16, 18 and 19. They will be so arranged as to indicate minutes on the right-hand pair of counters 15 and 16, while the degrees will be indicated by the left-hand pair of counters 18 and 19.

It is to be noted that although the left and right-hand pairs of counters are separated in the illustration, this is merely for the purpose of differentiating between the degree counters 18 and 19 and the minute counters 15 and 16. It will be understood that the ratio of revolutions made by each individual counter will be 10 to 1 in each case, except for the connection between the two minutes counters 15 and 16 where the ratio must be 6 to 1 because of the fact that there are only 6 digits (0–5) on the ten minutes counter.

These destination latitude indicators 12 and 13 are mechanically driven as indicated by a dashed line 21. Duplicate indicators 12 and 13 are employed because of the fact that latitude is measured north and south of the equator. The duplicate indicators 12 and 13 each are set up to read 0 degrees and 0 minutes at the equator. Then when the destination latitude is in the northern hemisphere, one of the indicators, e.g. indicator 12, will run in a forward direction and indicate the north latitude position. At this time, however, the other indicator 13 will be running in a reverse direction or backward, and its indication therefore will be meaningless. However, as soon as the equator is crossed and a destination in the southern hemisphere is to be indicated, the indicator 13 will be running in a forward direction and indicating properly the south latitude of such destination. It may be convenient for the visual indication to employ shutters (not shown) that will be actuated at the equator in order to blank off the visual indication of one of the indicators 12 and 13 during the time when that indicator is running backward and its indication is, therefore, meaningless.

There may be connected to the same mechanical drive (indicated by dashed line 21) a mechanical drive 22 that connects to a gear reduction 24 (schematically illustrated as a box) which transmits the drive to a resolver 26. This resolver may be any type of device which will produce a signal for use in a navigation system or otherwise. It will be observed that the rotor of resolver 26 will be positioned in proportion to the destination latitude that is being indicated by a given one of the indicators 12 or 13.

In order to set the destination latitude to a predetermined value in an automatic manner, there is provided an electric motor 28 that drives the mechanical connection illustrated by the dashed line 21. The motor 28 is also directly connected to a drum 32 by means of a shaft 30. Mechanically connected to the other end of the drum 32 by means of reduction gearing (not shown) or a Geneva movement (not shown), is a similar drum 34 which together with the drum 32 are used in connection with the minutes representation for the given destinations. Although the reduction gearing could employ conventional type of toothed gears, it is preferred to employ a Geneva type of movement so that no rotation of higher order drums will occur except periodically during a predetermined portion of each revolution of the next lower order. This renders the electric circuit action more positive as will appear more fully below.

There are similar drums 36, 38 and 40, which are each in turn connected to the preceding drum (i.e. the one next closer to the motor 28) with a turns ratio the same as that for the counter elements 15, 16, 18 and 19 of the indicators 12 and 13. In other words, the drums 32, 34, 36, 38 and 40 correspond to the counter elements of each of the elements 12 and 13. The reason for having an additional drum 40 which is in excess of the number of counters employed in the indicators 12 and 13 is that the range of latitude indication is 180 degrees, even though its indication is in terms of 90 degrees north and 90 degrees south, so that the drums 32, 34, 36, 38 and 40 must accommodate latitude indications in magnitudes up to 180 degrees, which involves three digits for the degress.

There is a tape 42 which is situated in close proximity with the surface of drums 32, 34, 36, 38 and 40. This tape 42 may be set to any desired position by means of a sprocket 44 at each edge of the tape 42 and which sprockets 44 co-operate with a series of holes 46 along the edges of the tape 42. The value of the latitude coordinate for a given destination will be determined and holes will be punched in the tape across the width thereof to represent such predetermined value of latitude. The tape 42 may be positioned by means of a motor 48 which drives the sprockets 44. The motor 48 may be controlled in any convenient manner as by relay controlled switch 50 illustrated.

There are a series of electric brushes 52 which are situated longitudinally over the surface of the drums 32, 34, 36, 38 and 40. The tape 42 comes between the brushes 52 and the surface of the drums 32—40 so that the brushes 52 do not contact the surface of the drums unless there is a hole punched in the tape under any given brush 52. On the drum 40 (the surface of the drum 40) there is a pair of slip rings 54 and 55. Cooperating with these slip rings 54 and 55 are two of the series of brushes mentioned, 52a and 52b. Acting upon the slip rings 54 and 55 there is a pair of brushes 57 and 58 which are located clear of the tape and make continuous contact with the respective slip rings 54 and 55. In circuit with the brushes 57 and 58, there are relays 60 and 61, respectively, that act to energize the motor 28 for clockwise or counterclockwise rotation.

Connected in circuit with the brushes 52 in a particular manner that will appear below, there is a further pair of relays 63 and 64. Also included in the circuits for these relays 63 and 64 are a series of brushes 66, 67, 68, 69, and 70, one for each drum 32, 34, 36, 38 and 40, respectively. These brushes are located clear of interference with the tape 42 and each maintain continuous contact with a corresponding slip ring 72, 73, 74, 75 and 76.

The motor 28 has a control circuit schematically illustrated at 78 that includes any operative circuit such as that illustrated in FIG. 6, including a switch 80 actuated by the relay 64. There is also a control switch 82 that may be manually actuated or by means of a relay if so desired.

A detailed circuit diagram for a controlling circuit that may be employed for motor 28 is illustrated in FIG. 6. It may be observed that although the motor 28 may be any feasible type of electric motor, the motor illustrated is a reversible shunt wound motor having an armature 83 and two fields 84 and 86. There is also a resistor 88 (in series with the fields 84 and 86) which may be short circuited by means of a switch 90 that is actuated by the relay 63. The fields 84 and 86 may be alternatively energized by means of switches 92 and 93 which are, respectively, actuated by the relays 60 and 61. It will be evident upon inspection of FIG. 6 that the motor control circuit provides means for energizing alternatively one field winding 86 or the other field winding 84 of the motor 28 so that the motor will run clockwise or counterclockwise. At the same time, the speed of the motor may be regulated by means of the switch 90 controlled by the relay 63, whereby the resistor 88 may be short circuited to increase the energization of the selected field and cause the motor to run more slowly.

FIG. 2 is a schematic development of the surfaces of the drums 32, 34, 36, 38 and 40 to illustrate the conducting sectors which are located on the surfaces of these drums. Connected to each of the slip rings 72, 73, 74, 75 and 76 there is a separate group of conducting sectors 95 located one under each of the brushes 52. The sectors 95 are electrically connected together on each drum as illustrated, and each group is also electrically connected to each of the slip rings 72 through 76. It will be observed that the sectors 95 are located in a staggered manner around the periphery of each drum, so that as each sector 95 is directly under its corresponding brush 52, the drum will have a given position in rotation. The position of the drums 32—40 is illustrated for the condition when the destination value as indicated by the drums 32, 34, 36, 38 and 40 is 90 degrees north or south latitude (depending upon the direction of operation of the motor 28 as well as that of the indicators 12 and 13 driven thereby).

It will be observed that there is a circuit beginning with a source of potential (not shown) and going via a switch 96 over a wire 98 to all of the brushes 52 located over the drum 40 (i.e. brushes 52a, 52b, 52c and 52d). From a given one of these brushes 52, e.g. brush 52c as shown in FIG. 2, this circuit may be continued via the contact sectors 95 on the drum 40 and the slip ring 76, to the brush 70. This circuit may then be continued over a wire 100 to the group of brushes 52 over the drum 38, and then in a similar manner from the selected one of the brushes 52 (as determined by the hole punched in tape 42) to a contact sector 95 of drum 38 and thence to the slip ring 75 and from there to the brush 69 and continuing via a wire 102 to the next group of brushes 52 over the drum 36. The circuit then may be continued in the same manner to each drum in succession via a similar wire 104 that carries the circuit to the next group of brushes 52 over drum 34 and then on via a corresponding wire 106 to the last group of brushes 52 over drum 32. It is to be noted that this circuit first completes an energizing circuit for the relay 63 as the slip ring 74 is energized, and then finally energizing circuit for the relay 64 is completed, as the slip ring 72 is energized.

Two additional circuits may be completed from the wire 98 via the brushes 52a and 52b in the group over the drum 40, including one of the two slip rings 54 or 55 with the cooperating brush 57 or 58, to energize one of the relays 60 or 61.

FIG. 3 is similar to FIG. 1 and is employed to indicate the longitude co-ordinate of a given destination. There are two indicators 108 and 109 that correspond to the indicators 12 and 13 in the latitude system. Here again in like manner as in the latitude system there are two indicators being driven simultaneously but in opposite directions and being employed to indicate the longitude of the destination. Each indicator 108 and 109 is made up of a series of revolution counters 111 and 112, there being two counters 111 for the minutes indication and three counters 112 for the degrees indication, because there are 180 degrees east or west in longitude measurement. As in the latitude unit, the indicators 108 and 109 are driven in opposite directions and the indications of only one of these indicators is a valid indication at any given time. As before, there may be an arrangement of a shutter device (not shown) to blank off the indicator which is not validly indicating a longitude position.

In navigation, it is desirable to have information concerning the difference between present position longitude and destination longitude so that in the illustrated system there is shown schematically a differential 114 that has one input driven from a mechanical connection 116 that connects a motor 118 (corresponding to the motor 28 of the latitude unit) with the two indicators 108 and 109. The other input to differential 114 is illustrated as a dashed line 120 and may be driven in accordance with the present position longitude. The output of the differential 114, is connected to a reduction gear 122 (schematically illustrated) and from thence to a resolver 123 corresponding to the resolver 26 of the latitude unit.

To avoid repetition, it is only necessary to point out that there are a series of drums 124, 125, 126, 127 and 128 corresponding to the drums 32, 34, 36, 38 and 40 of the latitude unit illustrated in FIG. 1. In like manner, there are corresponding brushes 130 like the brushes 52 of FIG. 1, and slip rings 132, 133, 134, 135 and 136 like the slip rings 72, 73, 74, 75 and 76 of FIG. 1. Also, there are the corresponding brushes cooperating with the slip rings 132 through 136, as well as a pair of brushes 138 and 139 that correspond with the brushes 57 and 58 of FIG. 1. Again, in like manner there are slip rings 142 and 143 on the drum 128 which are included in the circuits for relays 145 and 146 that correspond to relays 60 and 61 of FIG. 1. There is a tape 148 (corresponding with the tape 42 of FIG. 1), that is positioned by sprockets 150 driven by a motor 152. The correspondence of all of the elements illustrated in FIG. 3 to like elements illustrated in FIG. 1 will be evident, but it should be pointed out that on the drum 128 of the longitude unit (FIG. 3) there are four conducting sectors 154 (corresponding to sectors 95 of FIG. 1) instead of the two conducting sectors 95 carried by the drum 40 in FIG. 1. The reason for this will be obvious when it is considered that the values of destination longitudes cover a range of 360 degrees whereas the range covered by the latitude system is only 180 degrees, so that the first digit must be able to go as high as 3 in the longitude system.

It will be noted that the conducting sectors 95 and 154 on the high order drums 40 and 128 respectively, do not in each case, jointly cover a complete revolution of the drum on which they are located as is the case in all of the lower order drums. This construction could be altered if it is found desirable to eliminate the "dead" part of the two high order drums 40 and 128. This altered construction would employ sectors 95 on drum 40 which sectors would cover about 180 degrees of the drum periphery each, and sectors 154 on drum 128 which would cover about 90 degrees each. In order to use such altered construction the gear ratios would have to be correspondingly altered at the connection between drums 38 and 40 to a 2:1 ratio and between drums 127 and 128 to a 4:1 ratio (Geneva movement gearing being preferred).

FIG. 4 corresponds to the circuit diagram of FIG. 2 and illustrates schematically the basic electrical circuits involved for the longitude system illustrated in FIG. 3.

FIG. 5 illustrates a modification of this invention wherein a motor 156 is driving a pair of indicators 158 and 159 which correspond to the longitude indicators 108 and 109 illustrated in FIG. 3. In the modification of FIG. 5, there are a series of rotary switching devices 162, 163, 164, 165 and 166 which correspond to the drums 124 through 128 of the longitude unit illustrated in FIG. 3. These rotary switches are connected to the motor 156 to be driven at successively reduced ratios that correspond to the ratios of the individual counter units included in the indicators 158 and 159, with the exception that the two highest order switches 165 and 166 are directly connected together for a one to one ratio. These ratios are indicated in FIG. 5 by means of schematic reduction means 168, 169 and 170 that have turns ratios as indicated, i.e. 6 to 1, 10 to 1, and 40 to 1, respectively (switches 165 and 166 being connected directly at 1 to 1).

In this modification, a tape 173 is identical with the tape 148 of the longitude unit illustrated in FIG. 3. But, in this instance, there are rollers 175, 176, 177, 178 and 179 that have conducting material surfaces insulated from the rest of the roller and that are positioned in close proximity to the tape 173. There are electric brushes 182, 183, 184, 185 and 186 to carry an electric circuit to each of the conducting surfaced rollers 175 through 179. There is a pair of sprockets 188 for positioning the tape 173, and because the tape is below the sprockets 188, there is a cooperating pair of grooved wheels 190 situated beneath the tape 173 to support the tape while allowing the sprocket pins to have proper clearance. It will be readily evident that by means of a set of brushes 192 that correspond to the brushes 130 of FIG. 3, particular circuits may be completed by means of holes that are punched in the tape 173 to determine which circuits are to be completed. The remainder of the elements illustrated in FIG. 5 correspond to the various elements of the modification illustrated in FIG. 3, including relays 194 and 195 (corresponding to relays 145 and 146, respectively of FIG. 3) as well as the brushes 197 and 198 (corresponding to 138 and 139 of FIG. 3) that are in the circuits for the relays 194 and 195, respectively.

It will be noted that the circuits with the switch 165 have only been partly shown for the sake of clarity since there is a common wire connecting all four segments representing each of the ten digits. This arrangement will be clear from the showing of the two common circuits, one for the zero and one for the nine digit. The purpose of this arrangement is to gain the desired shaft position determination as controlled by the two highest order digits, as will be more fully described below.

Operation

To describe the operation of this invention, reference may be had first to FIG. 1. A predetermined destination has a given latitude which will be expressed in degrees and minutes in terms of north or south latitude. Such predetermined latitude will be converted into a corresponding tape value, using as a basis or beginning point zero degrees and zero minutes for 90 degrees north latitude, or for 90 degrees south latitude. Which of these two is to be employed as the zero value is entirely an arbitrary choice. The value for the destination latitude will then be encoded on the tape 42 by means of punched holes 200, there being one hole 200 punched for each of the drums 32, 34, 36, 38 and 40. By their position, these holes 200 will represent the digits of the encoded latitude value which has been predetermined. In addition to this punched value of latitude, there will be punched into the tape 42, near the left edge (as viewed in FIG. 1), a hole to represent clockwise or counterclockwise rotation of the motor 28. In this way, the motor 28 may be driven in the direction for the least number of revolutions from the last preceding destination.

When the tape 42 has been set to a new destination (as encoded thereon by means of the punched holes 200), the control switch 82 will be closed and the motor 28 will be energized to run in one direction or the other depending upon whether a hole 202 is punched for completing a circuit to relay 60 (as illustrated in FIG. 1) or for completing the other circuit to energize relay 61. The motor 28 will then run in the direction as determined by relay 60 or relay 61 (see FIG. 6) at full speed until a circuit for the reduced speed relay 63 has been completed, at which time the motor 28 will continue to operate in the same direction as before but at a reduced rate of speed. Then when the positions of the various drums 32, 34, 36, 38 and 40 have completed a circuit for the relay 64, this relay 64 will be energized, stopping the motor 28 at the position where one of the indicators 12 or 13 will indicate the predetermined latitude of the desired destination.

The circuits for carrying out the above operation may be also traced in detail in FIG. 2. Beginning with the circuits for directional relays 60 and 61, it will be observed that the tape 42 by means of the hole 202, will in the alternative, complete one of two circuits that are common beginning with the switch 96 and the wire 98 and going to a wire 204 that leads to both brushes 52a and 52b. From these brushes, one of the circuits (as determined by the hole 202 punched in the tape 42) (FIG. 1) will be completed to the slip ring 54 or 55, and then via the corresponding brush 57 or 58 the alternative circuit to relay 60 or 61 will be completed to one side of one of these relays. The other side of both relays 60 and 61 is connected to a return circuit which is connected to ground as illustrated. Energization of one of these directional relays 60 or 61 closes a circuit for one of the fields 84 or 86 of the motor 28 so that it will continue to run in a given direction. The energization of fields 84 and 86 are controlled by switches 92 and 93 that are actuated by the relay coils 60 and 61.

While the motor 28 is running, the conducting sectors 95 will be driven around to bring these sectors sequentially under the brushes 52, and a circuit will be completed as determined by a hole that is punched for each drum, as follows: From the source of supply and via switch 96 to wire 98 and then to the brushes 52c and 52d. The circuit then is continued via one of the brushes 52c or 52d, depending upon the destination latitude value as punched into the tape, to one of the conducting sectors 95 located on the drum 40, and thence via the electrical circuit (built into the drum in any convenient manner, e.g. as illustrated in FIG. 2) to the slip ring 76 which has the brush 70 in contact therewith. The circuit then is continued over the wire 100 to the next set of brushes 52 (located adjacent drum 38). The motor 28 continues to run, rotating the drum 32 continuously and the others intermittently because of the Geneva drive. When one of the brushes 52 (adjacent drum 38) under which a hole 200 is punched in the tape, has its conducting sector 95 rotated thereunder, the circuit will be continued in the same manner as previously described, i.e. from this brush 52, via the conducting sector thereunder and from there over the illustrated electrical circuit to the slip ring 75 and on via the brush 69 and the wire 102 to the next set of brushes 52 over the drum 36. It will now be evident that this circuit is continued from one drum to the next as the selected brush 52 has its conducting sector 95 rotated into contact therewith (beginning with the highest order) until the circuit is completed to the brush 68 where a wire 206 carries a circuit to relay 63. Since the other side of this relay 63 is connected to ground as illustrated, the relay 63 will be energized. When actuated, the relay will close switch 90 (see FIG. 6) and thereby short circuit the resistor 88 and slow down the speed of operation of the motor 28. The motor continues running, however, so that the circuit is transferred in the same manner as before from the drum 36 to the next succeeding drum 34 and then again to the final or lowest order drum 32. When the circuit is completed via one of the brushes 52 adjacent the drum 32, to the corresponding conducting sector 95 and then to the slip ring 72 and brush 66, a circuit for the relay 64 will be completed via a wire 208 that connects one side of the relay 64 with the source of energy (introduced via the switch 96). The other side of the relay 64 is connected to the return circuit or ground as illustrated. Upon the relay 64 being energized the main circuit for the motor 28 will be broken by means of the switch 80 (FIG. 6) and the motor 28 will stop at the predetermined indication of latitude.

It will be readily observed that the same situation applies with regard to the longitude co-ordinate for the predetermined destination, there being merely two additional conducting sectors on the final drum 128 of the longitude unit (FIGS. 3 and 4) in order to be able to cover the full range of longitude which includes 360 degrees.

The modification illustrated in FIG. 5 is basically similar and its operation will be readily understood from the foregoing explanation. However, in brief, its operation is as follows: A predetermined destination will have its corresponding holes punched into the tape 173 so that an alternative circuit to relay 194 or 195 will be completed to set up a desired direction of operation of the motor 156. Also, the proper circuits for the brushes 192 that cooperate with the several conducting surfaced rollers 175 through 179 will be completed. As before, series circuits beginning with the highest order digit of the tape encoded destination co-ordinate value, will be carried from a source by means of the brush 182 to the conducting roller 175, and then via a given one of the brushes 192 to a sector of the rotary switching device 166, from where the circuit is carried to the brush 183.

The circuit then continues via conducting roller 176 to a given one of the brushes 192 and again as the sweep arm of the rotary switching device 165 reaches this particular circuit (of a group selected by the high order switching device 166, and as determined by a hole in the tape 173) the series circuit is continued to the brush 184 of the conducting roller 177, and so on until a circuit for a relay 210 causes this relay to be actuated and thereby stops the motor 156 at the proper position to indicate the predetermined longitude of a given destination.

It will be understood that there is necessarily another unit (not shown) similar to that illustrated in FIG. 5 which carries a tape having the latitude co-ordinate encoded thereon and which operates in the same manner to cause a motor to drive the latitude indicators corresponding to indicators 12 and 13 of FIG. 1 to give the latitude of the predetermined destination.

While the invention has been set forth in detail showing specific illustrations thereof in accordance with the applicable statutes, this is not to be taken as in any way limiting the invention but merely as descriptive thereof.

It is claimed:

1. A motor control system for causing a motor driving a digital type revolution counter to run a predetermined amount and stop comprising a tape having a digital quantity encoded thereon, a plurality of circuits, said code including holes in the tape having predetermined locations for each digit value, circuit means including hole sensing devices for grouping said plurality of circuits to correspond to the digital orders, said circuit means connecting each digital order group in series with the next group and including an electro-magnetic motor de-energizing device, means controlled by a hole in said tape for energizing the motor to run in a given direction, and rotary switching means connected to each digital order group of circuits, said switching means being driven by the motor in correspondence with the revolution counters so that the de-energizing device will be actuated and the motor stopped when the digital quantity on the tape is registered by the revolution counters.

2. A motor control system for causing a motor driving a digital type revolution counter to run a predetermined amount and stop comprising a tape having a digital quantity encoded thereon, a plurality of circuits, said code including holes in the tape having predetermined locations for each digit value, circuit means including hole sensing devices for grouping said plurality of circuits to correspond to the digital orders there being one circuit for each unit of magnitude for each order, said circuit means connecting each digital order group in series with the next group, means included in said circuit means for reducing the speed of the motor, further means included in said circuit for de-energizing the motor, means controlled by a hole in said tape for energizing the motor to run in a given direction, a drum for each group of circuits, said drum having conducting segments corresponding to the digital units of magnitude, said drums being juxtaposed in proximity to said tape, means connecting said drums together in series for rotation in proportion to the encoded digital orders, and coupling means for directly driving the lowest order drum from the motor to cause the motor to run to a predetermined position corresponding to the quantity encoded on the tape and stop.

3. A motor control system for causing a motor driven digital type revolution counter to run a predetermined amount and stop comprising: a digital revolution counter having a plurality of orders, a motor connected to said counter for differentially driving the orders thereof, a tape having a digital quantity encoded thereon, said code including holes in the tape having predetermined locations for each digit value, an electrical circuit for each unit magnitude of each tape encoded order, circuit means including tape hole sensing devices for grouping said electrical circuits to correspond to the digital orders of said tape encoded quantity, said circuit means connecting each digital order group in series with the next group, means controlled by a hole in said tape for energizing said motor to run in a given direction, means also included in said circuit means for reducing the speed of said motor, further means included in said circuit for deenergizing said motor, a separate rotary switching element for the electrical circuits of each tape encoded order, means connecting said rotary switching elements mechanically in series and to said motor, and a connection between the rotary switching element for the lowest order and said motor deenergizing means whereby said motor will be deenergized when the digital quantity encoded on the tape is reached by said revolution counter.

4. A motor control system for causing a motor driven order digital type revolution counter to run a predetermined amount and stop comprising: a revolution counter having a plurality of orders, a motor, a connection between said motor and said revolution counter such that the orders of said revolution counter are differentially driven by said motor, a tape having a digital quantity encoded thereon, said code including holes in the tape having predetermined locations for each digit value, an electrical circuit for each unit magnitude of each encoded order, circuit means including tape hole sensing devices for grouping said electrical circuits to correspond to said tape encoded quantity, said circuit means connecting each digital order group in series to the next group and including a motor deenergizing device, a motor control circuit under control of a hole in said tape adapted to energize said motor, separate rotary switching means connected to the electrical circuits of each tape encoded order, said rotary switching means being connected to said motor for drive thereby in correspondence with said revolution counter, and a connection between the rotary switching means for the lowest order and said motor deenergizing means whereby said motor deenergizing device will be actuated and said motor stopped when the digital quantity on the tape is registered by said revolution counter.

References Cited in the file of this patent

UNITED STATES PATENTS

| | | |
|---|---|---|
| 2,471,843 | Stamper | May 31, 1949 |
| 2,537,427 | Seid | Jan. 9, 1951 |
| 2,566,972 | Wheeler | Sept. 4, 1951 |
| 2,710,934 | Senn | June 14, 1955 |
| 2,741,732 | Cunningham | Apr. 10, 1956 |
| 2,762,123 | Schultz | Sept. 11, 1956 |
| 2,792,545 | Kamm | May 14, 1957 |